US012613911B2

(12) United States Patent
Zhang

(10) Patent No.: US 12,613,911 B2
(45) Date of Patent: Apr. 28, 2026

(54) VIDEO SEARCH METHOD AND APPARATUS, SERVER, AND TERMINAL DEVICE

(71) Applicant: Beijing Zitiao Network Technology Co., Ltd., Beijing (CN)

(72) Inventor: Wanyao Zhang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/843,797

(22) PCT Filed: Jul. 27, 2023

(86) PCT No.: PCT/CN2023/109538
§ 371 (c)(1),
(2) Date: Sep. 4, 2024

(87) PCT Pub. No.: WO2024/082756
PCT Pub. Date: Apr. 25, 2024

(65) Prior Publication Data
US 2025/0217414 A1 Jul. 3, 2025

(30) Foreign Application Priority Data
Oct. 17, 2022 (CN) .......................... 202211290117.9

(51) Int. Cl.
*G06F 16/735* (2019.01)
*G06F 16/738* (2019.01)
*G06F 16/75* (2019.01)

(52) U.S. Cl.
CPC .......... *G06F 16/735* (2019.01); *G06F 16/738* (2019.01); *G06F 16/75* (2019.01)

(58) Field of Classification Search
CPC ...... G06F 16/735; G06F 16/738; G06F 16/75; G06F 16/00; G06F 16/7867
See application file for complete search history.

(56) References Cited

U.S. PATENT DOCUMENTS

| | | | |
|---|---|---|---|
| 11,294,964 B2 * | 4/2022 | Sun | G06F 16/90348 |
| 12,108,120 B2 * | 10/2024 | Lu | G06V 40/161 |

(Continued)

FOREIGN PATENT DOCUMENTS

| | | |
|---|---|---|
| CN | 101517512 A | 8/2009 |
| CN | 104219575 A | 12/2014 |

(Continued)

OTHER PUBLICATIONS

Patel et al., "Content Based Video Retrieval Systems", International Journal of UbiComp (IJU), vol. 3, No. 2, Apr. 2012, pp. 13-30 (Year: 2012).*

(Continued)

*Primary Examiner* — Jared M Bibbee
(74) *Attorney, Agent, or Firm* — Alleman Hall LLP

(57) ABSTRACT

The present disclosure provides a video search method, apparatus, server, and terminal device, the method comprising: acquiring search information; parsing the search information to acquire at least one field; when it is determined that there is a first video in a pre-built database that matches the search information according to the at least one field, acquiring the first video when a second video having an association with the search information is screened out from the database according to the first video, taking the first video and the second video as a search result and sending it to a terminal device, wherein the first video is a reply video which is generated by an object according to commentary content under any main video, and the second video comprises the main video, and/or, a video of the same category as the first video.

16 Claims, 5 Drawing Sheets

(56) References Cited

U.S. PATENT DOCUMENTS

| | | | | |
|---|---|---|---|---|
| 2005/0289163 | A1* | 12/2005 | Gordon | G06F 16/48 |
| 2011/0099195 | A1* | 4/2011 | Patwardhan | G06F 16/738 |
| | | | | 707/769 |
| 2015/0373395 | A1* | 12/2015 | Schmieder | H04N 21/4143 |
| | | | | 386/241 |
| 2018/0107673 | A1* | 4/2018 | Goikhman | G06F 16/7867 |
| 2019/0129905 | A1* | 5/2019 | Goikhman | G06F 16/951 |
| 2023/0401238 | A1* | 12/2023 | Khan | G06F 16/245 |

FOREIGN PATENT DOCUMENTS

| | | |
|---|---|---|
| CN | 107220387 A | 9/2017 |
| CN | 108307232 A | 7/2018 |
| CN | 109547853 A | 3/2019 |
| CN | 111294660 A | 6/2020 |
| CN | 112291497 A | 1/2021 |
| CN | 113987158 A | 1/2022 |
| CN | 114003772 A | 2/2022 |
| CN | 114430503 A | 5/2022 |
| CN | 115525792 A | 12/2022 |
| JP | 2001292407 A | 10/2001 |
| KR | 1020210048107 A | 5/2021 |

OTHER PUBLICATIONS

China National Intellectual Property Administration, Notice of Allowance Issued in Application No. 202211290117.9, Feb. 18, 2025, 8 pages.

China National Intellectual Property Administration, Office Action and Search Report Issued in Application No. 202211290117.9, Nov. 26, 2024, 12 pages.

Liu, Y., "Large Scale Data Management in Video Social Network," Dissertation, University of Science and Technology of China, May 3, 2011, 111 pages.

ISA China National Intellectual Property Administration, International Search Report and Written Opinion Issued in Application No. PCT/CN2023/109538, Aug. 22, 2023, WIPO, 9 pages. Submitted with translation of Search Report.

* cited by examiner

Obtaining a matched first video according to the search information — 510

Acquiring a second video according to key information and the search information in the first video — 520

Extracting preset content from the first video and/or the second video — 610

According to the preset content, generating preview information corresponding to the video collection — 620

VIDEO SEARCH METHOD AND APPARATUS, SERVER, AND TERMINAL DEVICE

CROSS-REFERENCE TO RELATED APPLICATIONS

The present application claims the benefit of priority from the International Patent Application No. PCT/CN2023/ 109538 and the CN patent for invention application Ser. No. 20/221,1290117.9, titled as "VIDEO SEARCH METHOD AND APPARATUS, SERVER, AND TERMINAL DEVICE" filed with the China National Intellectual Property Administration on Oct. 17, 2022, which is hereby incorporated by reference in its entirety into the present application.

TECHNICAL FIELD

The present application falls into the technical field of computers, and in particular relates to a video search method and apparatus, server, and terminal device.

BACKGROUND ART

With the rise of short videos, more and more people begin to pay attention to and participate in operations such as the production and sharing of short videos, so as to feel the fun of short videos. Based on this context, more and more short video anchors share their videos for other users to watch and comment.

There are also more and more people, searching for their own interesting videos in corresponding applications or websites.

SUMMARY

The present disclosure provides a video search method and apparatus, server, and terminal device.

In a first aspect, the present disclosure provides a video search method, the method comprising:

acquiring search information;

parsing the search information to acquire at least one field;

when it is determined that there is a first video in a pre-built database that matches the search information according to the at least one field, acquiring the first video, when a second video having an association with the search information is screened out from the database according to the first video, taking the first video and the second video as a search result and sending it to a terminal device, wherein the first video is a reply video which is generated by an object according to commentary content under any main video, and the second video comprises the main video and/or a video of the same category as the first video.

According to the method provided by an embodiment of the present disclosure, search information is acquired; and then the search information is parsed to acquire at least one field. When it is determined that there is a first video in a pre-built database that matches the search information according to the at least one field, the first video is acquired. When a second video having an association with the search information is screened out from the database according to the first video, the first video and the second video are taken as a search result and sent to a terminal device. Wherein the first video is a reply video which is generated by an object according to commentary content under any main video, and the second video comprises the main video and/or a video of the same category as the first video. During the above operation, the server can recall the reply video according to the search information, that is, the video that an object (such as the object making comments under the main video) is interested in. In the present disclosure, not only the reply video can be provided for the object, but also more videos related to the search information can be provided for the object. That is, the matching degree between the obtained video and the search information is relatively high, which greatly improves the application experience of the object for video search. It is precisely because the obtained videos are all videos with high matching degree with the search information, it can promote the improvement of video click-through rate and video viewing rate. Related videos usually have more learning value, and promoting them to more objects can facilitate object learning.

Optionally, the screening out a second video having an association with the search information from the database according to the first video, comprises particularly:

acquiring key information corresponding to the first video according to the first video;

extracting at least one video corresponding to the key information from the database according to the key information; screening out a second video having an association with the search information from the at least one video.

In one instance, first, key information corresponding to the first video is extracted, wherein the key information can be, for example, fields in a theme name of the first video, an author of the first video, a category of the first video, and so on. Then, at least one video corresponding to the key information is extracted from the database, and a second video having an association with the search information is screened out from the at least one video. In this process, when the key information of the first video is used to extract at least one video corresponding to the key information from the database, it is equivalent to accurately narrowing a search range from a large number of videos. In the narrowed search range, a second video having an association with the search information is searched. Doing so will improve accuracy and efficiency of video search. The obtained videos are not only rich in content, but also more close to videos that the object wants to obtain.

Optionally, when the second video is the main video, and the database includes reply videos respectively generated for a plurality of comments of the same main video, the method further comprises:

classifying a plurality of reply videos according to the key information of each reply video;

establishing an association between the main video and the reply videos of the same category, and storing the reply videos of the same category in a preset storage location.

When the reply videos are respectively generated for multiple comments of the same main video, according to the key information of each reply video, the plurality of reply videos are classified, an association between the main video and the reply videos of the same category is established, and the reply videos of the same category are stored in the same storage location. When an object obtains a reply video, for example, after obtaining a main video according to any of the above embodiments, according to the association between the main video and the reply video of a specific category, one can also directly obtain and feed reply videos of the same category back to the terminal device. Of course, one can also find out a reply video of the same category according to a category association between a reply video in the same category and other reply videos, and then feed it back to the terminal device. Either way, the number of videos fed back to the terminal device can be increased, and the object can be successfully helped to obtain more useful videos, and the click-through rate and viewing rate of videos can also be improved.

In a second aspect, the present disclosure provides a video search method, the method comprising:

receiving search information;

determining at least one video collection matching the search information; wherein the video collection comprises a first video, and a second video corresponding to the first video, the first video being a reply video generated by an object according to commentary content under any main video; the second video comprising the main video, and/or a video in the same category as the first video;

generating preview information corresponding to the video collection according to the first video and/or the second video;

displaying the preview information on the search result page, and displaying the video collection according to the preview information.

According to the method provided by an embodiment of the present disclosure, after the search information is received, at least one video collection matching the search information is determined, the video collection comprises a first video, and a second video corresponds to the first video. The preview information corresponding to the video collection is generated according to the first video and/or the second video. The preview information is displayed on the search result page, and the video collection is displayed according to the preview information. Wherein the first video is a reply video which is generated by an object according to commentary content under any main video, and the second video comprises the main video and/or a video of the same category as the first video. In this way, some key information is extracted from the obtained video as preview information, which can, on one hand, facilitate the object to get to know instantly content of the currently displayed video when viewing the preview information. On the other hand, it can also prompt the object to open the video and improve the click-through rate and viewing rate of the video. Moreover, the obtained video has a higher matching degree with the search information, and the types and quantities of videos displayed to the object are relatively richer.

Optionally, the determining at least one video collection matching the search information, comprises particularly:

obtaining a matched first video according to the search information;

acquiring a second video according to key information and search information in the first video, wherein the key information is a video theme in the first video or a key field in video content.

After obtaining the matched first video according to the information, acquiring the second video according to the key information and search information in the first video, where the key information can be the video theme in the first video or the key field in the video content. Through the video theme in the first video or the key field in the video content, one can search for videos with high association with the first video, and then screen out a second video related to the search information from these videos according to the search information. In the entire process, the use of the key information of the first video to obtain at least one video, is equivalent to accurately narrowing a search range from a large number of videos. In the narrowed search range, one can, then, search for a second video having an association with the search information. Doing so will improve accuracy and efficiency of video search. The obtained videos are not only rich in content, but also more close to videos that the object wants to obtain.

Optionally, the generating preview information corresponding to the video collection according to the first video and/or the second video, comprises particularly:

extracting preset content from the first video and/or the second video, wherein the preset content is configured for responding to the search information;

generating preview information corresponding to the video collection according to the preset content.

The preset content is extracted from the first video and/or the second video, and the preset content can respond to the search information. Then taking the preset content as preview information will play a more eye-catching role, so that after seeing the preview information, the object can know that the currently obtained video is a video that matches the search information entered by itself.

Optionally, the preset content comprises a preset key frame in the first video and/or the second video displayed in a dynamic manner; or, the preset content comprises preset image content in the first video and/or the second video.

Optionally, the displaying a video collection and preview information on the search result page, comprises particularly:

when it is detected that the preview information is triggered, displaying a next video sequentially after the current video in the video collection has been played according to a preset sorting order, wherein the video generating the preview information is displayed first, and the videos in the video collection are sorted in advance according to association with the search information;

or, dynamically displaying the first video after detecting that the preview information is triggered;

when it is determined that the display of the first video is completed, selecting recommended videos from the video collection and displaying them according to a preset recommendation mode.

After it is detected that the preview information is triggered, the videos in the video collection can be displayed in various manners. For example, according to the preset sorting order, displaying a next video after the current video has been played. Of course, a video that can respond to the search information should be displayed first, that is, the video that generates the preview information. The particularly defined sorting order is an order sorted in advance according to the association with the search information. In another instance, it is also possible to dynamically display the first video after it is detected that the preview information is triggered, and after the display of the first video is completed, select recommended videos from the video collection and displaying a them according to preset recommendation mode. A variety of video display methods can enhance the viewing experience of an object.

Optionally, when displaying the first video, a first identification information is displayed at a preset position of the first video, the first identification information being configured for indicating that the first video is a reply video;

or, when a second displaying video, a second identification information is displayed at a preset position of the second video, the second identification information being configured for indicating that the second video is any reference video other than the reply video.

When a video is displayed, an attribute of the video is indicated by highlighted identification information, such as whether it is a reply video or any reference video other than the reply video.

In a third aspect, the present disclosure provides a video search apparatus, the apparatus comprising:

an acquiring module configured for acquiring search information;

a parsing module configured for parsing the search information to acquire at least one field;

a processing module configured for, when it is determined that there is a first video in a pre-built database that matches the search information according to the at least one field, acquiring the first video; screening out a video having an association with the search information from the database according to the first video;

a sending module, configured for, when the processing module screens out a second video having an association with the search information from the database according to the first video, sending the first video and the second video as a search result to the terminal device, wherein the first video is a reply video generated by an object according to commentary content under any main video; the second video comprises the main video, and/or a video of the same category as the first video.

The video search apparatus provided by an embodiment of the present disclosure, acquires search information; and then parses the search information to acquire at least one field. When it is determined that there is a first video in a pre-built database that matches the search information according to the at least one field, the first video is acquired. When a second video having an association with the search information is screened out from the database according to the first video, the first video and the second video are taken as a search result and sent to a terminal device. Wherein the first video is a reply video which is generated by an object according to commentary content under any main video, and the second video comprises the main video and/or a video of the same category as the first video. During the above operation, the server can recall the reply video according to the search information, that is, the video that an object (such as the object making comments under the main video) is interested in. In the present disclosure, not only the reply video can be provided for the object, but also more videos related to the search information can be provided for the object. That is, the matching degree between the obtained video and the search information is relatively high, which greatly improves the application experience of the object for video search. It is precisely because the obtained videos are all videos with high matching degree with the search information, it can promote the improvement of video click-through rate and video viewing rate. Related videos usually have more learning value, and promoting them to more objects can facilitate object learning.

In a fourth aspect, the present disclosure provides a video search apparatus, the apparatus comprising:

a receiving module configured for receiving search information;

a matching module configured for, determining at least one video collection matching the search information; wherein the video collection comprises a first video, and a second video corresponding to the first video, the first video being a reply video generated by an object according to commentary content under any main video; the second video comprising the main video, and/or a video in the same category as the first video;

a generating module configured for generating preview information corresponding to the video collection according to the first video and/or the second video;

a displaying module configured for displaying the preview information on the search result page, and displaying the video collection according to the preview information.

According to the video search apparatus provided by an embodiment of the present disclosure, after the search information is received, at least one video collection matching the search information is determined, the video collection comprises a first video, and a second video corresponds to the first video. The preview information corresponding to the video collection is generated according to the first video and/or the second video. The preview information is displayed on the search result page, and the video collection is displayed according to the preview information. Wherein the first video is a reply video which is generated by an object according to commentary content under any main video, and the second video comprises the main video and/or a video of the same category as the first video. In this way, some key information is extracted from the obtained video as preview information, which can, on one hand, facilitate the object to get to know instantly content of the currently displayed video when viewing the preview information. On the other hand, it can also prompt the object to open the video and improve the click-through rate and viewing rate of the video. Moreover, the obtained video has a higher matching degree with the search information, and the types and quantities of videos displayed to the object are relatively richer.

In a fifth aspect, there is provided a server comprising a processor, a communication interface, a memory and a communication bus, wherein the processor, the communication interface and the memory communicate with each other through the communication bus;

the memory is configured for storing a computer program;

the processor is configured for executing the program stored in the memory to implement steps of the video search method according to any embodiment of the first aspect.

In a sixth aspect, there is provided a terminal device comprising a processor, a communication interface, a memory and a communication bus, wherein the processor, the communication interface and the memory communicate with each other through the communication bus;

the memory is configured for storing a computer program;

the processor is configured for executing the program stored in the memory to implement steps of the video search method according to any embodiment of the second aspect.

In a seventh aspect, there is provided a computer-readable storage medium, on which a computer program is stored, which, when executed by a processor, implement steps of the video search method according to any embodiment of the first aspect; or, implement steps of the video search method according to any embodiment of the second aspect.

BRIEF DESCRIPTION OF THE DRAWINGS

The drawings attached thereto are intended to provide further understanding of the present invention, which drawings constitute part of the description, and together with the embodiments of the present invention, serve to interpret the present invention and do not constitute limitation over the present invention. In the drawings.

DETAILED DESCRIPTION OF PREFERRED EMBODIMENTS

In order to make the objectives, technical solutions and advantages of the embodiments of the present disclosure more clear, with reference to the drawings of the embodiments of the present disclosure, a clear and complete description is given below for the technical solutions of the embodiments of the present disclosure. Obviously, the embodiments described below are only part of the embodiments, rather than all of the embodiments. All other embodiments that can be obtained by those skilled in the art based on the embodiments of the present disclosure without any creative effort are included in the protection scope of the present disclosure.

In order to facilitate the understanding of the embodiments of the present disclosure, specific embodiments will be further explained with reference to the attached drawings, and the embodiments do not constitute limitations to the embodiments of the present disclosure.

When people search for their own interesting videos in corresponding applications or websites, it is possible that degree of association between the obtained video and the video you want to obtain is not particularly high, or even if it is an associated video, it is not the video that the user wants. The accuracy and quality of the obtained videos may be somewhat different from user's expectation, leading to reduced search efficiency.

In view of the technical problems mentioned in the background art, the present disclosure provides a video search method, apparatus, server, and terminal device.

Figure 1:
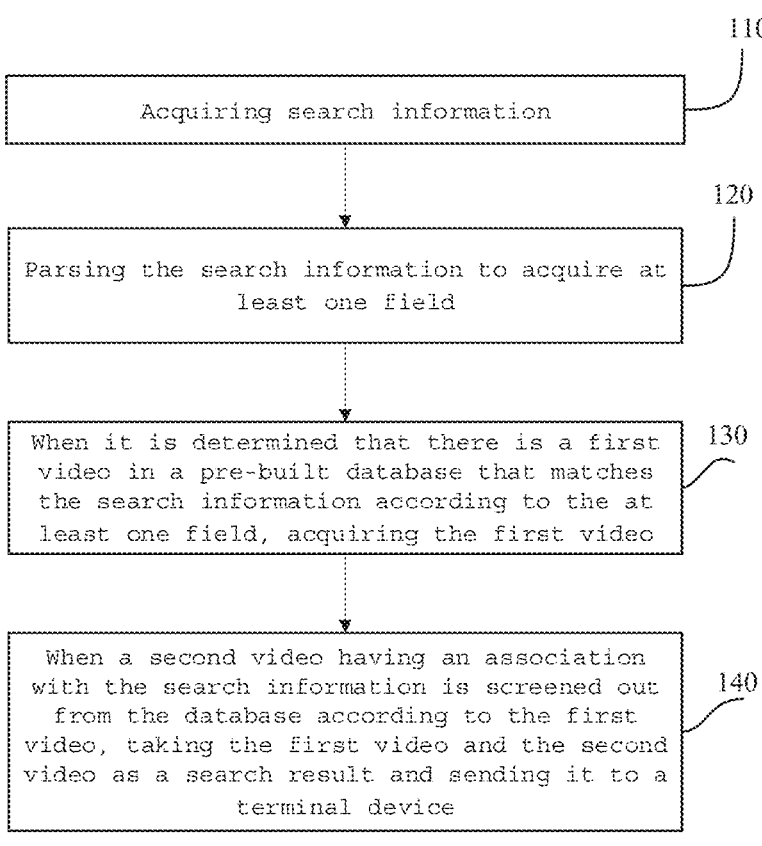
FIG. 1 is a flowchart of a video search method provided by an embodiment of the present disclosure.

Referring specifically to FIG. 1, FIG. 1 is a flowchart of a video search method provided by an embodiment of the present disclosure. In an alternative example, the method is executed by a server, and the method comprises the following steps:

Step 110: acquiring search information.

Step 120: parsing the search information to acquire at least one field;

Particularly, an existing, well-developed technical means can be adopted for parsing the search information to acquire at least one field, which will not be described in detail here.

Step 130: when it is determined that there is a first video in a pre-built database that matches the search information according to the at least one field, acquiring the first video.

In particular, after parsing the search information, one can acquire at least one field. Then, each of the at least one field can be matched with videos existing in the database, so as to determine whether there is a video matching one or more of the at least one field among the videos existing in the database.

If there is a video matching with one or more fields in at least one field in the database, it is further determined whether there is a first video.

In an alternative example, the first video is a reply video generated by an object according to commentary content under any main video.

Step 140: when a second video having an association with the search information is screened out from the database according to the first video, sending the first video and the second video as a search result to the terminal device.

When there is a reply video, then, screening out a second video having an association with the search information from the database according to the first video.

In an alternative example, the second video may comprises the main video mentioned above, that is, the original video that generated the reply video. Of course, it can also be a video of the same category as the first video. In a specific example, videos that are of the same category as the first video are, for example, different reply videos generated based on the commentary content under the same main video, and these reply videos are all reply videos generated for the same category of questions.

Association between the main video, the reply video, the videos of the same category as the reply video and other videos will be very high. Moreover, these screened out videos all have an association with the search information. Further, these videos are fed back altogether to a terminal device for the terminal device to show to the object that generated the search information, so that the object that generated the search information can obtain more types of and richer videos according to the search information. And these videos are all recalled with the reply video as a "bridge". All recalled videos are relatively interesting to the object (the object that generated the search information), so that this method can improve the application experience of the object for video search.

According to a video search method provided by an embodiment of the present disclosure, search information is acquired, and then the search information is parsed to obtain at least one field. When it is determined that there is a first video in a pre-built database that matches the search information according to the at least one field, the first video is acquired. When a second video having an association with the search information is screened out from the database according to the first video, the first video and the second video are taken as a search result and are sent to a terminal device. Wherein the first video is a reply video which is generated by an object according to commentary content under any main video, and the second video comprises the main video and/or a video of the same category as the first video. During the above operation, the server can recall the reply video according to the search information, that is, the video that an object (such as the object making comments under the main video) is interested in. In the present disclosure, not only the reply video can be provided for the object, but also more videos related to the search information can be provided for the object. That is, the matching degree between the obtained video and the search information is relatively high, which greatly improves the application experience of the object for video search. It is precisely because the obtained videos are all videos with high matching degree with the search information, it can promote the improvement of video click-through rate and video viewing rate. Related videos usually have more learning value, and promoting them to more objects can facilitate object learning.

Figure 2:
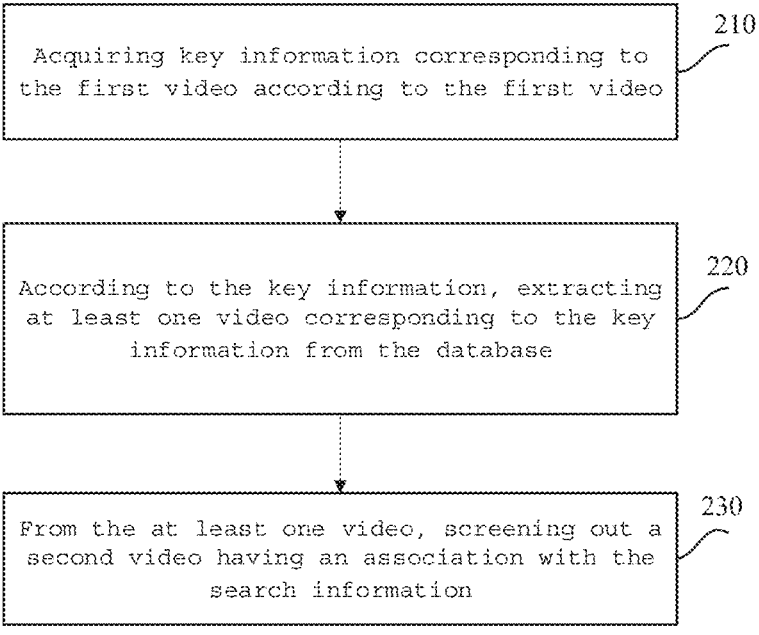
FIG. 2 is a flowchart of another video search method provided by an embodiment of the present disclosure.

On the basis of the above embodiment, the present disclosure provides another video search method. Specific content thereof that is the same as or similar to the above embodiment, will not be repeated here. In this embodiment, how to screen out the second video having an association with the search information from the database according to the first video, will be the focus of the below description. Referring to FIG. 2, FIG. 2 is a flowchart of another video search method provided by an embodiment of the present disclosure, the method comprising the following steps:

Step 210: acquiring key information corresponding to the first video according to the first video.

In particular, the key information may comprise, for example, a theme name of the first video, some fields in the theme name, information of author that generates the first video, category information of the first video, and so on. The category information of the first video mentioned here can refer to the category information of the reply video of the same category, introduced in the previous embodiment.

Step 220: extracting at least one video corresponding to the key information from the database according to the key information.

In particular, for example, if the key information is information of the author that generates the first video, then all videos released by the author can be extracted from the pre-built database according to the author information. Or, when the key information is the theme name of the first video, for example, the theme name of the first video is how to raise huskies. Then, according to the theme name of the first video, "how to raise huskies", the video matching theme name can be matched from the pre-built database. Or, according to some fields in the theme name, such as "raising huskies" or "huskies", one or more videos can be found from the pre-built database, such as how to raise a mother Husky, how to play with huskies and so on. Among these videos, there may be a main video corresponding to the reply video, or there may be videos of the same category as the reply video.

Step 230: from at least one video, screening out a second video having an association with the search information.

In particular, from the obtained videos, videos related to the search information are searched. For example, if the search information is how to raise five-month-old huskies, and the obtained videos includes the main video of how to raise huskies, then the video can be obtained through screening. Of course, one can also search for videos of the same category as those of how to raise five-month-old huskies, such as how to raise eight-month-old huskies, how to raise male huskies and so on. The above screening processes are all based on an association between the second video and the reply video, and the second video is obtained according to the association and the search information.

In this way, firstly, key information corresponding to the first video is extracted, such as fields in the theme name of the first video, author of the first video, category of the first video and so on. Then, at least one video corresponding to the key information is extracted from the database, and a second video having an association with the search information is screened out from the at least one video. In this process, when the key information of the first video is used to extract at least one video corresponding to the key information from the database, it is equivalent to accurately narrowing a search range from a large number of videos. In the narrowed search range, one can, then, search for a second video having an association with the search information. Doing so will improve accuracy and efficiency of video search. The obtained videos are not only rich in content, but also more close to videos that the object wants to obtain.

On the basis of any of the above embodiments, the present disclosure also provides another video search method, and content thereof that is the same as or similar to any of the above embodiments will not be repeated here. In this embodiment, when the second video is the main video, and the database comprises reply videos respectively generated for multiple comments of the same main video, some preparatory work that can be done in advance will be introduced in detail, for assisting in subsequent search for a second video related to the reply video when the reply video is obtained.

Figures 3, 4:
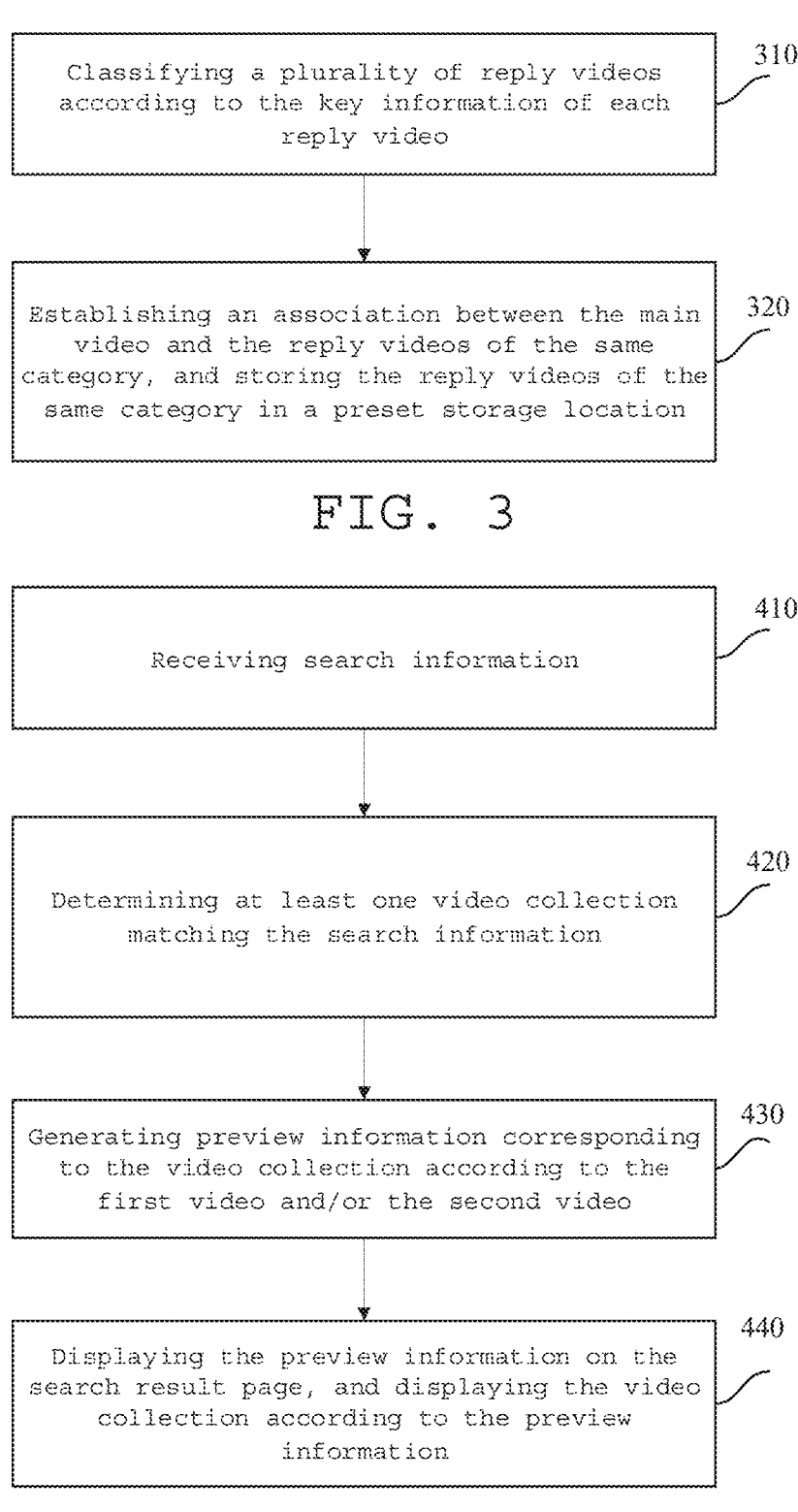
FIG. 3 is a flowchart of another video search method provided by an embodiment of the present disclosure.
FIG. 4 is a flowchart of another video search method provided by an embodiment of the present disclosure.

In an alternative example, specific preparation work may comprise performing clustering operations on multiple reply videos, and establishing an association between each category of reply video and the main video. Referring specifically to FIG. 3, FIG. 3 is a flowchart of another video search method provided by an embodiment of the present disclosure, the method comprising the following steps:

Step 310: classifying a plurality of reply videos according to the key information of each reply video;

Step 320: establishing an association between the main video and the reply videos of the same category, and storing the reply videos of the same category in a preset storage location.

In particular, the key information in the reply video has been explained in the previous embodiment, and will not be repeated here.

The reply videos are classified according to the key information. For example, videos such as how to raise a husky, how to raise a 7-month-old husky, and how to raise a one-year-old husky can be classified into one category. When implementing this operation, for example, the key information is the theme name, then the clustering operation can be completed by the theme names of multiple reply videos, and multiple reply videos with high similarity in theme names can be classified into one category. In another instance, for example, if the key information is video content, then the clustering operation can also be completed according to the video content in multiple reply videos. A specific clustering algorithm can be, for example, k-means clustering algorithm, and of course, other algorithms that can determine a degree of association between different videos can also be used, so that there is no excessive restriction here.

Through the above method, it can be ensured that when an object obtains a reply video, for example, after obtaining a main video through any of the above embodiments, reply videos of the same category can be directly obtained and fed back to a terminal device according to an association between the main video and the reply video of a specific category. Of course, one can also find out a reply video of the same category according to a category association between a reply video in the same category and other reply videos, and then feed it back to the terminal device. Either way, the number of videos fed back to the terminal device can be increased, and the object can be successfully helped to obtain more useful videos, and the click-through rate and viewing rate of videos can also be improved.

Corresponding to any of the above embodiments, the present disclosure further provides another video search method that is executed by a terminal device. The method comprises the following steps. Referring specifically to FIG. 4, FIG. 4 is a flowchart of another video search method provided by an embodiment of the present disclosure, the method comprising:

Step 410: receiving search information.

In particular, search the information is search information input by an object through an information input interface of a terminal device. In this embodiment, the search information generally refers to video content to be searched by the object.

Step 420: determining at least one video collection matching the search information.

After obtaining the search information, the terminal device can search the video set matching the search information through a search engine.

Wherein the first video is a reply video generated according to commentary content under any main video. The second video comprises the main video or a video of the same category as the first video. The video of the same category mentioned here, for example, is also a reply video generated according to the commentary content under the main video. Among the reply videos of the same category, for example, the first reply video is how to raise huskies, and the second reply video is how to raise a female husky. A plurality of videos in the same category can usually be videos with logical association, such as the first reply video and the second reply video listed above.

Step 430: generating preview information corresponding to the video collection according to the first video and/or the second video.

Step 440: displaying the preview information on the search result page, and displaying the video collection according to the preview information.

In particular, the preset content is extracted from the first video and/or the second video as preview information corresponding to the video collection. By displaying the preview information on the search result display page, the object can be informed of content outline of the video collection to be displayed at present, or a video direction, such as a video used to explain what content the video collection is. In this way, it is convenient for the object to have an understanding of the video content without seeing the specific video, so as to assist in judging whether it is the video it wants to get to know.

According to one video search method provided by an embodiment of the present disclosure, after the search information is received, at least one video collection matching the search information is determined, the video collection comprises a first video, and a second video corresponds to the first video. The preview information corresponding to the video collection is generated according to the first video and/or the second video. The preview information is displayed on the search result page, and the video collection is displayed according to the preview information. Wherein the first video is a reply video which is generated by an object according to commentary content under any main video, and the second video comprises the main video and/or a video of the same category as the first video. In this way, some key information is extracted from the obtained video as preview information, which can, on one hand, facilitate the object to get to know instantly content of the currently displayed video when viewing the preview information. On the other hand, it can also prompt the object to open the video and improve the click-through rate and viewing rate of the video. Moreover, the obtained video has a higher match-ing degree with the search information, and the types and quantities of videos displayed to the object are relatively richer.

Figures 5, 6:
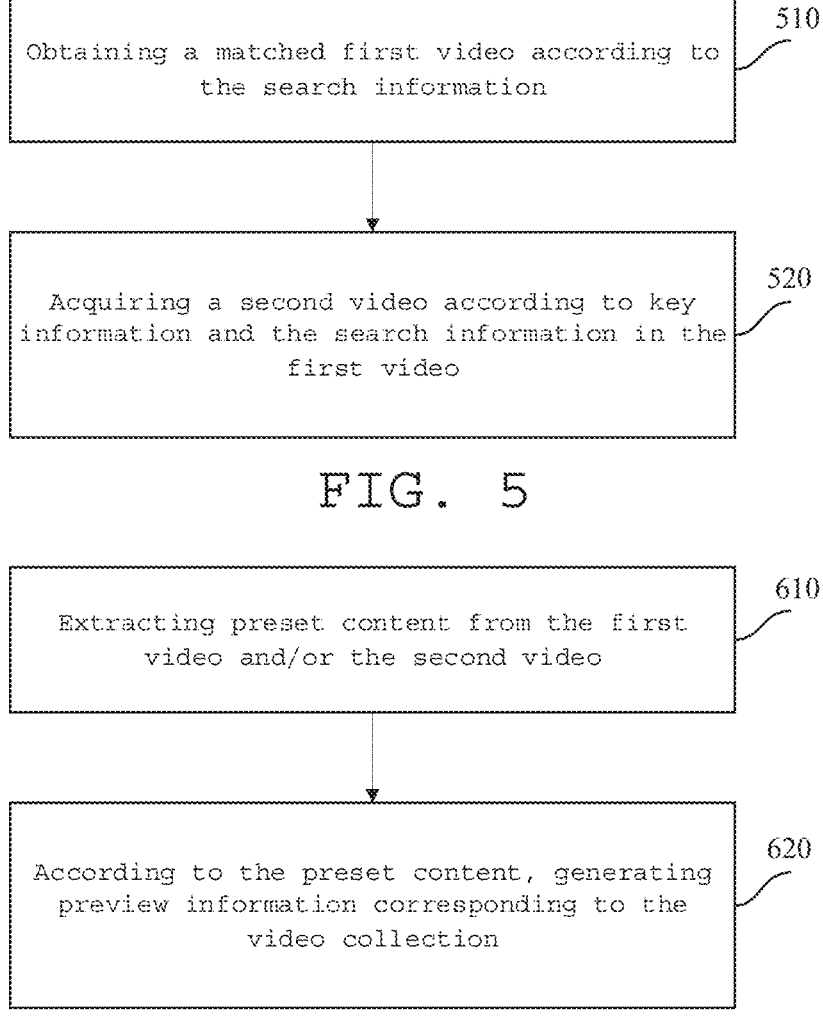
FIG. 5 is a flowchart of another video search method provided by an embodiment of the present disclosure.
FIG. 6 is a flowchart of another video search method provided by an embodiment of the present disclosure.

Optionally, o the basis of the above embodiment, the present disclosure further provides another video search method. Content thereof that is the same as or similar to the above embodiment, will not be repeated here. In this embodiment, how to determine at least one video collection matching the search information, will be described in detail. Referring specifically to FIG. 5, FIG. 5 is a flowchart of a video search method provided by an embodiment of the present disclosure, the method comprising:

Step 510: obtaining a matched first video according to the search information.

Step 520: acquiring a second video according to key information and search information in the first video.

In particular, a terminal device searches the first video matching the search information through a search engine, and then extracts key information from the first video. In an alternative example, the key information may comprise, for example, a theme name of the first video, some fields in the theme name, information of author that generates the first video, category information of the first video, and so on. The category information of the first video mentioned here, is the category information of the reply video of the same cat-egory.

Thereafter, a second video according to key information and search information in the first video are acquired.

In particular, for example, if the key information is information of the author that generates the first video, then all videos released by the author can be extracted according to the author information. Or, when the key information is the theme name of the first video, for example, the theme name of the first video is how to raise huskies. Then, according to the theme name of the first video, how to raise huskies, a video matching the theme name is searched and obtained. Or, according to some fields in the theme name, such as "raising huskies" or "huskies", one or more videos can be obtained, such as how to raise a female husky, how to play with huskies and so on.

Among these videos obtained according to the key infor-mation of the first video, there are some videos that have an association with the search information, then, according to the search information, the second video can be screened out from these videos. For example, if the search information is how to raise five-month-old huskies, and the obtained videos includes the main of video how to raise huskies, then this video can be obtained through screening. Of course, one can also search for videos of the same category as how to raise five-month-old huskies, such as how to raise eight-month-old huskies, how to raise male huskies and so on. The key fields in these videos are similar to those in the search information, so they can be recalled directly.

In the above embodiment, the use of the key information of the first video to obtain at least one video, is equivalent to accurately narrowing a search range from a large number of videos. In the narrowed search range, one can, then, search for a second video having an association with the search information. Doing so will improve accuracy and efficiency of video search. The obtained videos are not only rich in content, but also more close to videos that the object wants to obtain.

On the basis of the embodiment corresponding to FIG. 4 or FIG. 5, the present disclosure further provides another video search method. Content thereof that is the same as or similar to the embodiment corresponding to FIG. 4 or FIG. 5, will not be repeated here. In this embodiment, how to generating preview information corresponding to the video collection according to the first video and/or the second video, will be described in detail. Referring specifically to FIG. 6, FIG. 6 is a flowchart of another video search method provided by an embodiment of the present disclosure, the method comprising the following steps:

Step 610: extracting preset content from the first video and/or the second video, wherein the preset content is configured for responding to the search information.

Step 620: generating preview information corresponding to the video collection according to the preset content.

In particular, there is preset content that can respond to the search information, in the first video and/or the second video.

In a specific example, the preset content, for example, may comprise: a preset key frame in the first video and/or the second video displayed in a dynamic manner; or, the preset content comprises preset image content in the first video and/or the second video.

Then, the preset key frame or preset image content can be extracted in advance by an existing, well-developed method in an offline or online state. Then, it is used as the preview information of the video collection, and after a terminal device obtains the video collection, it is shown to the object in advance in the form of preview information.

Since the preview information is used to respond to the search information, it will play a more eye-catching role, so that after seeing the preview information, the object can get to know that the currently obtained video is a video that matches the search information entered by itself.

In another alternative example, the present disclosure further provides an embodiment of another video search method, which embodiment is executed on the basis of any embodiment corresponding to FIG. 4 to FIG. 6. Therefore, content thereof that is the same as or similar to any embodiment corresponding to FIG. 4 to FIG. 6, will not be repeated here. In this embodiment, how to display the video collection on the search result page, the preview information displaying the video collection on the search result page, and the preview information will be described in detail. The method comprises the following steps:

when it is detected that the preview information is triggered, displaying a next video sequentially after the current video in the video collection has been played according to a preset sorting order, wherein the video generating the preview information is displayed first, and the videos in the video collection are sorted in advance according to association with the search information;

or, dynamically displaying the first video after detecting that the preview information is triggered;

when it is determined that the display of the first video is completed, selecting recommended videos from the video collection and displaying them according to a preset recommendation mode.

In a specific example, when it is detected that the preview information is triggered, all the videos can be sorted according to association of the videos with the search information. For example, a video that generates the preview information is ranked first, that is, the video with the highest association with the search information. Since the preview information can respond to the search information, it has naturally the highest association. The association degree between each video in the video collection and the search information is determined, and then the association degree with the search information can be determined according to the video content/video theme in the video collection.

As for the specific manner of calculating the association degree, for example, the clustering algorithm can be used to obtain the statistics of the similarity between the content in the video and the search information, or the similarity between the video theme name and the search information. Or, the association degree between different videos and the search information can be determined by another manner through which the association degree between each video in the video collection and the search information can be known. For example, it is determined that the reply video is the video with the highest association degree, and the main video that generates the reply video is the video with the second highest association degree. Among the videos in the same category as the reply video, the statistics of the content similarity between different videos in the same category and the reply video is obtained, and then the association degree between different videos in the same category and the search information is determined. Finally, videos in the video collection according to the degree of association are displayed.

In another specific example, it is also possible to set directly the first video to be displayed dynamically after the preview information is triggered, and then select recommended videos from the video collection and display them according to a recommendation mode after the display of the first video is completed. The specific display mode can refer to the recommended display mode of videos in the related art, and will not be repeated in details here.

In the above embodiment, after it is detected that the preview information is triggered, the videos in the video collection can be displayed in various manners. For example according to a preset sorting order, the next video is displayed after the current video has been played. Of course, a video that can respond to the search information should be displayed first, that is, the video that generates the preview information. The particularly defined sorting order is an order sorted in advance according to the association with the search information. In another instance, it is also possible to dynamically display the first video after it is detected that the preview information is triggered, and after the display of the first video is completed, select recommended videos from the video collection and displaying them according to a preset recommendation mode. A variety of video display methods can enhance the viewing experience of an object.

In another alternative example, the present disclosure further provides an embodiment of another video search method, on the basis of the previous embodiment, the method further comprises:

when displaying the first video, a first identification information is displayed at a preset position of the first video, the first identification information being configured for indicating that the first video is a reply video;

or, when displaying a second video, a second identification information is displayed at a preset position of the second video, the second identification information being configured for indicating that the second video is any reference video other than the reply video.

Figure 7:
FIG. 7 is a schematic diagram showing a specific form of a reply video provided by the present disclosure.

In particular, one may refer to FIG. 7. FIG. 7 is a schematic diagram showing a specific form of a reply video provided by the present disclosure. FIG. 7 schematically shows one of the instances introduced in this embodiment. That is, when displaying the first video, a first identification information is displayed at a preset position of the first video, the first identification information being configured for indicating that the first video is a reply video. Referring particularly to the illustration of FIG. 7, the search information shown in FIG. 7 is "how to raise a 5-month husky". FIG. 7 shows that a reply video, "Reply How To Raise a Husky #husky", has been obtained. At the beginning of the title of the reply video, "Reply" is in bold to highlight that the video is a reply video. In this video, the first identification information is "Reply".

If this video is another reference video, different identification information can be displayed in a manner similar to that shown in FIG. 7 to distinguish the currently displayed videos. And, this display manner can more conspicuously inform the object of what type of video is currently obtained.

Figure 8:
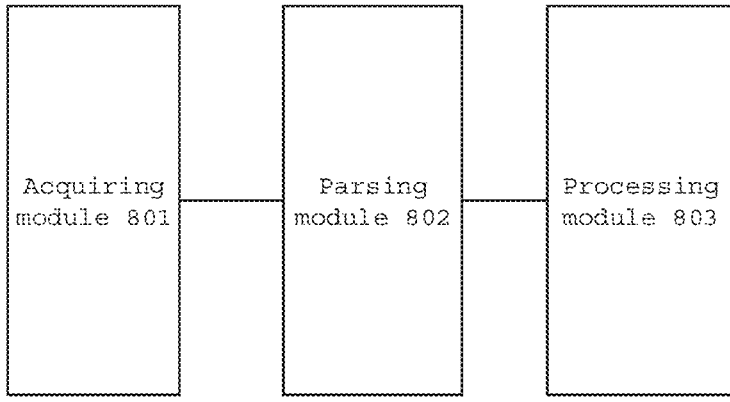
FIG. 8 is a schematic structural diagram of a video search apparatus provided by an embodiment of the present disclosure.

FIG. 8 is a schematic structural diagram of a video search apparatus provided by an embodiment of the present disclosure, the apparatus comprising: an acquiring module 801, a parsing module 802, and a processing module 803.

The acquiring module 801 is configured for acquiring search information.

The parsing module 802 is configured for parsing the search information to acquire at least one field.

The processing module 803 is configured for, when it is determined that there is a first video in a pre-built database that matches the search information according to the at least one field, acquiring the first video; screening out a video having an association with the search information from the database according to the first video.

A sending module, is configured for, when the processing module 803 screens out a second video having an association with the search information from the database according to the first video, sending the first video and the second video as a search result to the terminal device, wherein the first video is a reply video generated by an object according to commentary content under any main video; the second video comprises the main video, and/or a video of the same category as the first video.

Optionally, the processing module 803 is particularly configured for:

acquiring key information corresponding to the first video according to the first video;

extracting at least one video corresponding to the key information from the database according to the key information;

screening out a second video having an association with the search information from the at least one video.

Optionally, the processing module 803 is further configured for: when the second video is the main video, and the database includes reply videos respectively generated for a plurality of comments of the same main video, classifying a plurality of reply videos according to the key information of each reply video;

establishing an association between the main video and the reply videos of the same category, and storing the reply videos of the same category in a preset storage location.

Functions performed by individual components in the video search apparatus provided by the embodiment of the present disclosure have been described in detail in any method embodiment corresponding to FIG. 1 to FIG. 3, so that they are not repeated here.

A video search apparatus provided by an embodiment of the present disclosure, acquires search information, and then parses the search information to acquire at least one field, when it is determined that there is a first video in a pre-built database that matches the search information according to the at least one field, acquires the first video. When a second video having an association with the search information is screened out from the database according to the first video, taking the first video and the second video as a search result and sending it to a terminal device. Wherein the first video is a reply video which is generated by an object according to commentary content under any main video, and the second video comprises the main video and/or a video of the same category as the first video. During the above operation, the server can recall the reply video according to the search information, that is, the video that an object (such as the object making comments under the main video) is interested in. In the present disclosure, not only the reply video can be provided for the object, but also more videos related to the search information can be provided for the object. That is, the matching degree between the obtained video and the search information is relatively high, which greatly improves the application experience of the object for video search. It is precisely because the obtained videos are all videos with high matching degree with the search information, it can promote the improvement of video click-through rate and video viewing rate. Related videos usually have more learning value, and promoting them to more objects can facilitate object learning.

Figure 9:
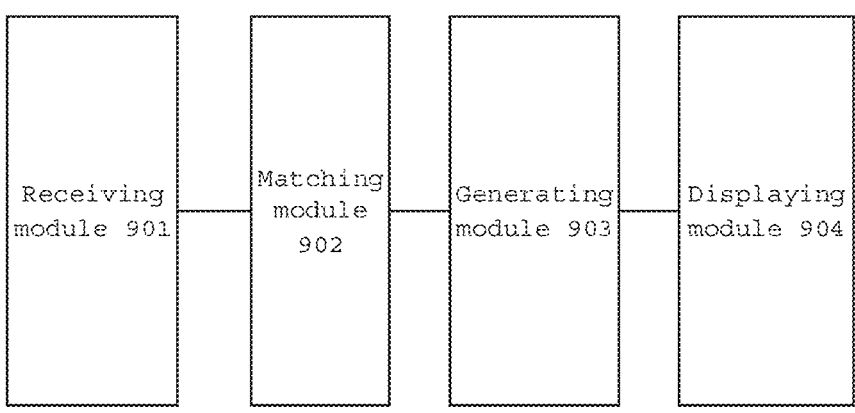
FIG. 9 is a structural schematic diagram of another video search apparatus provided by an embodiment of the present disclosure.

FIG. 9 is a schematic structural diagram of another video search apparatus provided by an embodiment of the present disclosure, the apparatus comprising: a receiving module 901, a matching module 902, a generating module 903, and a displaying module 904.

The receiving module 901 is configured for receiving search information.

The matching module 902 is configured for, determining at least one video collection matching the search information; wherein the video collection comprises a first video, and a second video corresponding to the first video, the first video being a reply video generated by an object according to commentary content under any main video; the second video comprising the main video, and/or a video in the same category as the first video.

The generating module 903 is configured for generating preview information corresponding to the video collection according to the first video and/or the second video.

The displaying module 904 is configured for displaying the preview information on the search result page, and displaying the video collection according to the preview information.

Optionally, the matching module 902 is particularly configured for obtaining a matched first video according to the search information.

A second video is acquired according to key information and search information in the first video, wherein the key information is a video theme in the first video or a key field in video content.

Optionally, the generating module 903 is particularly configured for: extracting preset content from the first video and/or the second video, wherein the preset content is configured for responding to the search information;

generating preview information corresponding to the video collection according to the preset content.

Optionally, the preset content comprises a preset key frame in the first video and/or the second video displayed in a dynamic manner; or, the preset content comprises preset image content in the first video and/or the second video.

Optionally, the displaying module 904 is particularly configured for, when it is detected that the preview information is triggered, displaying a next video sequentially after the current video in the video collection has been played according to a preset sorting order, wherein the video generating the preview information is displayed first, and the videos in the video collection are sorted in advance according to association with the search information;

or, dynamically displaying the first video after detecting that the preview information is triggered;

when it is determined that the display of the first video is completed, selecting recommended videos from the video collection and displaying them according to a preset recommendation mode.

Optionally, the displaying module 904 is further configured for, when displaying the first video, a first identification information is displayed at a preset position of the first video, the first identification information being configured for indicating that the first video is a reply video;

or, when displaying a second video, a second identification information is displayed at a preset position of the second video, the second identification information being configured for indicating that the second video is any reference video other than the reply video.

Functions performed by individual components in the video search apparatus provided by the embodiment of the present disclosure have been described in detail in any method embodiment corresponding to FIG. 4 to FIG. 7, so that they are not repeated here.

A video search apparatus provided by an embodiment of the present disclosure, after receiving search information, determines at least one video collection matching the search information, the video collection comprising a first video, and a second video corresponding to the first video; generates preview information corresponding to the video collection according to the first video and/or the second video; displays the preview information on the search result page, and displays the video collection according to the preview information, wherein the first video is a reply video which is generated by an object according to commentary content under any main video, and the second video comprises the main video and/or a video of the same category as the first video. In this way, some key information is extracted from the obtained video as preview information, which can, on one hand, facilitate the object to get to know instantly content of the currently displayed video when viewing the preview information. On the other hand, it can also prompt the object to open the video and improve the click-through rate and viewing rate of the video. Moreover, the obtained video has a higher matching degree with the search information, and the types and quantities of videos displayed to the object are relatively richer.

Figure 10:
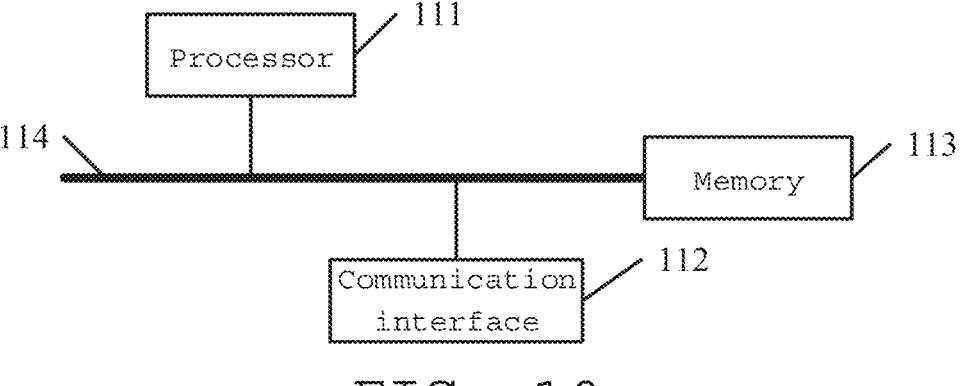
FIG. 10 is a schematic structural diagram of a server provided by an embodiment of the present disclosure.

As shown in FIG. 10, an embodiment of the present disclosure provides a server comprising a processor 111, a communication interface 112, a memory 113 and a communication bus 114, wherein the processor 111, the communication interface 112 and the memory 113 communicate with each other through the communication bus 114.

The memory is configured for storing a computer program;

In an embodiment of the present disclosure, the processor 111, when executing a program stored in the memory 113, implements the video search method provided by any of the above method embodiments, the method comprising:

acquiring search information;

parsing the search information to acquire at least one field;

when it is determined that there is a first video in a pre-built database that matches the search information according to the at least one field, acquiring the first video, when a second video having an association with the search information is screened out from the database according to the first video, taking the first video and the second video as a search result and sending it to a terminal device, wherein the first video is a reply video which is generated by an object according to commentary content under any main video, and the second video comprises the main video and/or a video of the same category as the first video.

Optionally, the screening out a second video having an association with the search information from the database according to the first video, comprises particularly:

acquiring key information corresponding to the first video according to the first video;

extracting at least one video corresponding to the key information from the database according to the key information;

screening out a second video having an association with the search information from the at least one video.

Optionally, when the second video is the main video, and the database includes reply videos respectively generated for a plurality of comments of the same main video, the method further comprises:

classifying a plurality of reply videos according to the key information of each reply video;

establishing an association between the main video and the reply videos of the same category, and storing the reply videos of the same category in a preset storage location.

Figure 11:
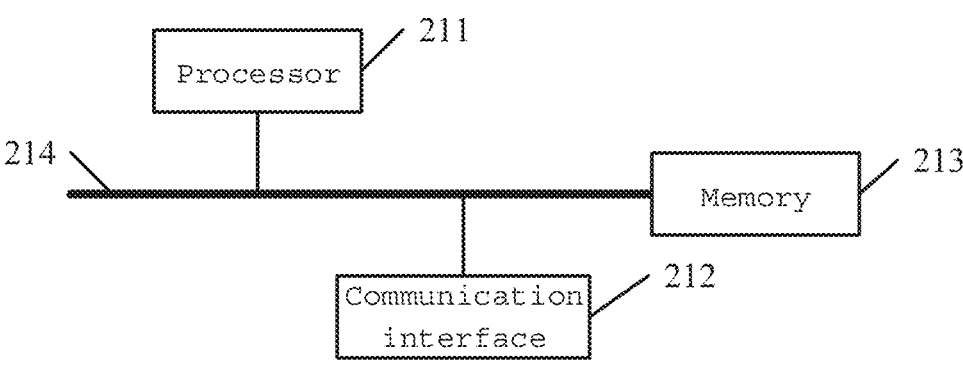
FIG. 11 is a schematic structural diagram of a terminal device provided by an embodiment of the present disclosure.

As shown in FIG. 11, an embodiment of the present disclosure provides a terminal device, comprising a processor 211, a communication interface 212, a memory 213 and a communication bus 214, wherein the processor 211, the communication interface 212 and the memory 213 communicate with each other through the communication bus 214.

The memory 213 is configured for storing a computer program.

In an embodiment of the present disclosure, the processor 211, when executing a program stored in the memory 213, implements the video search method provided by any of the above method embodiments, the method comprising:

receiving search information;

determining at least one video collection matching the search information; wherein the video collection comprises a first video, and a second video corresponding to the first video, the first video being a reply video generated by an object according to commentary content under any main video; the second video comprising the main video, and/or a video in the same category as the first video;

generating preview information corresponding to the video collection according to the first video and/or the second video; displaying the preview information on the search result page, and displaying the video collection according to the preview information.

Optionally, the determining at least one video collection matching the search information, comprises particularly:

obtaining a matched first video according to the search information; acquiring a second video according to key information and search information in the first video, wherein the key information is a video theme in the first video or a key field in video content.

Optionally, the generating preview information corresponding to the video collection according to the first video and/or the second video, comprises particularly:

extracting preset content from the first video and/or the second video, wherein the preset content is configured for responding to the search information;

generating preview information corresponding to the video collection according to the preset content.

Optionally, the preset content comprises a preset key frame in the first video and/or the second video displayed in a dynamic manner; or, the preset content comprises preset image content in the first video and/or the second video.

Optionally, the displaying a video collection and preview information on the search result page, comprises particularly:

when it is detected that the preview information is triggered, displaying a next video sequentially after the current video in the video collection has been played according to a preset sorting order, wherein the video generating the preview information is displayed first, and the videos in the video collection are sorted in advance according to association with the search information;

or, dynamically displaying the first video after detecting that the preview information is triggered;

when it is determined that the display of the first video is completed, selecting recommended videos from the video collection and displaying them to a according preset recommendation mode.

Optionally, when displaying the first video, a first identification information is displayed at a preset position of the first video, the first identification information being configured for indicating that the first video is a reply video;

or, when displaying a second video, a second identification information is displayed at a preset position of the second video, the second identification information being configured for indicating that the second video is any reference video other than the reply video.

An embodiment of the present disclosure provides a computer storage medium, on which a computer program is stored, and the computer program, when executed by a processor, implements steps of the video search method provided by any of the method embodiments as shown in FIGS. 1-3.

Or, the computer program, when executed by a processor, implements steps of the video search method provided by any of the method embodiments as shown in FIGS. 4-7.

It should be noted that in this context, relational terms such as "first" and "second" are only used to distinguish one entity or operation from another entity or operation, and do not necessarily require or imply that there is any such actual relationship or order between these entities or operations. Moreover, terms "comprising", "including" or any other variation thereof are intended to cover non-exclusive inclusion, so that a process, method, article or apparatus including a series of elements includes not only those elements, but also other elements not explicitly listed or elements inherent to such process, method, article or apparatus. Without further restrictions, an element defined by the phrase "comprising one" does not exclude the existence of other identical elements in the process, method, article or apparatus comprising the element.

The above is only specific embodiments of the present disclosure to enable those skilled in the art to understand or realize the present disclosure. Many modifications to these embodiments will be obvious to those skilled in the art, and the general principles defined herein can be implemented in other embodiments without departing from the spirit or scope of the present disclosure. Therefore, the present disclosure will not be limited to these embodiments described herein, but is to be accorded the widest scope consistent with the principles and novel features disclosed herein.

What is claimed is:

1. A video search method, comprising:

acquiring search information;

parsing the search information to acquire at least one field;

in response to determining that there is a first video in a pre-built database that matches the search information according to the at least one field, acquiring the first video;

in response to screening out a second video having an association with the search information from the database according to the first video, taking the first video and the second video as a search result and sending it to a terminal device, wherein the first video is a reply video which is generated by an object according to commentary content under any main video, and the second video comprises the main video, or a video of same category as the first video, or both the main video and the video of same category as the first video, wherein the screening out the second video having the association with the search information from the database according to the first video comprises:

acquiring key information corresponding to the first video according to the first video;

extracting at least one video corresponding to the key information from the database according to the key information; and screening out the second video having the association with the search information from the at least one video.

2. The method according to claim 1, wherein in response to that the second video is the main video, and the database includes reply videos generated respectively for a plurality of comments of same main video, the method further comprises:

classifying a plurality of reply videos according to the key information of each reply video;

establishing an association between the main video and the reply videos of same category, and storing the reply videos of the same category in a preset storage location.

3. A non-transitory computer-readable storage medium, on which a computer program is stored, wherein the computer program, when executed by a processor, implement steps of the video search method according to claim 1.

4. A video search method comprising:

receiving search information;

determining at least one video collection matching the search information; wherein the video collection comprises a first video, and a second video corresponding to the first video, the first video being a reply video generated by an object according to commentary content under any main video; the second video comprising the main video, or a video of same category as the first video, or both the main video and the video of same category as the first video;

generating preview information corresponding to the video collection according to the first video, or according to the second video, or according to both the first video and the second video;

displaying the preview information on a search result page, and displaying the video collection according to the preview information, wherein the determining the at least one video collection matching the search information comprises:

obtaining a matched first video according to the search information;

acquiring the second video according to key information and the search information in the first video, wherein the key information is a video theme in the first video or a key field in video content.

5. The method according to claim 4, wherein the generating preview information corresponding to the video collection according to the first video, or the second video, or according to both the first video and the second video comprises:

extracting preset content from the first video, or from the second video, or from both the first video and the second video, wherein the preset content is configured for responding to the search information; and generating the preview information corresponding to the video collection according to the preset content.

6. The method according to claim 5, wherein the preset content comprises a preset key frame in the first video, or a preset key frame in the second video, or both the preset key frame in the first video and the preset key frame in the second video displayed in a dynamic manner; or, the preset content comprises preset image content in the first video, or preset image content in the second video, or both the preset image content in the first video and the preset image content in the second video.

7. The method according to claim 4, wherein the displaying a video collection and preview information on the search result page comprises:

in response to detecting that the preview information is triggered, displaying a next video sequentially after the current video in the video collection has been played according to a preset sorting order, wherein the video generating the preview information is displayed first, and the videos in the video collection are sorted in advance according to association with the search information;

or, dynamically displaying the first video after detecting that the preview information is triggered;

in response to determining that the display of the first video is completed, selecting recommended videos from the video collection and displaying them according to a preset recommendation mode.

8. The method according to claim 7, wherein in response to displaying the first video, a first identification information is displayed at a preset position of the first video, the first identification information being configured for indicating that the first video is a reply video;

or, in response to displaying the second video, a second identification information is displayed at a preset position of the second video, the second identification information being configured for indicating that the second video is any reference video other than the reply video.

9. A terminal device, comprising a processor, a communication interface, a memory and a communication bus, wherein the processor, the communication interface and the memory communicate with each other through the communication bus;

the memory is configured for storing a computer program;

the processor is configured for executing the program stored in the memory to implement steps of the video search method according to claim 4.

10. The terminal device according to claim 9, wherein the generating preview information corresponding to the video collection according to the first video, or according to the second video, or according to both the first video and the second video comprises:

extracting preset content from the first video, or from the second video, or from both the first video and the second video, wherein the preset content is configured for responding to the search information; and generating the preview information corresponding to the video collection according to the preset content.

11. The terminal device according to claim 10, wherein the preset content comprises a preset key frame in the first video, or a preset key frame in the second video, or both the preset key frame in the first video and the preset key frame in the second video displayed in a dynamic manner; or, the preset content comprises preset image content in the first video, or preset image content in the second video, or both the preset image content in the first video and the preset image content in the second video.

12. The terminal device according to claim 9, wherein the displaying a video collection and preview information on the search result page comprises:

in response to detecting that the preview information is triggered, displaying a next video sequentially after the current video in the video collection has been played according to a preset sorting order, wherein the video generating the preview information is displayed first, and the videos in the video collection are sorted in advance according to association with the search information;

or, dynamically displaying the first video after detecting that the preview information is triggered;

in response to determining that the display of the first video is completed, selecting recommended videos from the video collection and displaying them according to a preset recommendation mode.

13. The terminal device according to claim 12, wherein in response to displaying the first video, a first identification information is displayed at a preset position of the first video, the first identification information being configured for indicating that the first video is a reply video;

or, in response to displaying the second video, a second identification information is displayed at a preset position of the second video, the second identification information being configured for indicating that the second video is any reference video other than the reply video.

14. A non-transitory computer-readable storage medium, on which a computer program is stored, wherein the computer program, when executed by a processor, implement steps of the video search method according to claim 4.

15. A server comprising a processor, a communication interface, a memory and a communication bus, wherein the processor, the communication interface and the memory communicate with each other through the communication bus;

the memory is configured for storing a computer program;

the processor is configured for executing the program stored in the memory to implement steps of a video search method, wherein the method comprises:

acquiring search information;

parsing the search information to acquire at least one field;

in response to determining that there is a first video in a pre-built database that matches the search information according to the at least one field, acquiring the first video;

in response to that a second video having an association with the search information is screened out from the database according to the first video, taking the first video and the second video as a search result and sending it to a terminal device, wherein the first video is a reply video which is generated by an object according to commentary content under any main video, and the second video comprises the main video, or a video of same category as the first video, or both the main video and the video of same category as the first video, wherein screening out the second video having the association with the search information from the database according to the first video comprises:

acquiring key information corresponding to the first video according to the first video;

extracting at least one video corresponding to the key information from the database according to the key information; and screening out the second video having the association with the search information from the at least one video.

16. The server according to claim 15, wherein in response to that the second video is the main video, and the database includes reply videos generated respectively for a plurality of comments of same main video, the method further comprises:

classifying a plurality of reply videos according to the key information of each reply video;

establishing an association between the main video and the reply videos of same category, and storing the reply videos of the same category in a preset storage location.

* * * * *